Figures 1, 2, 3:
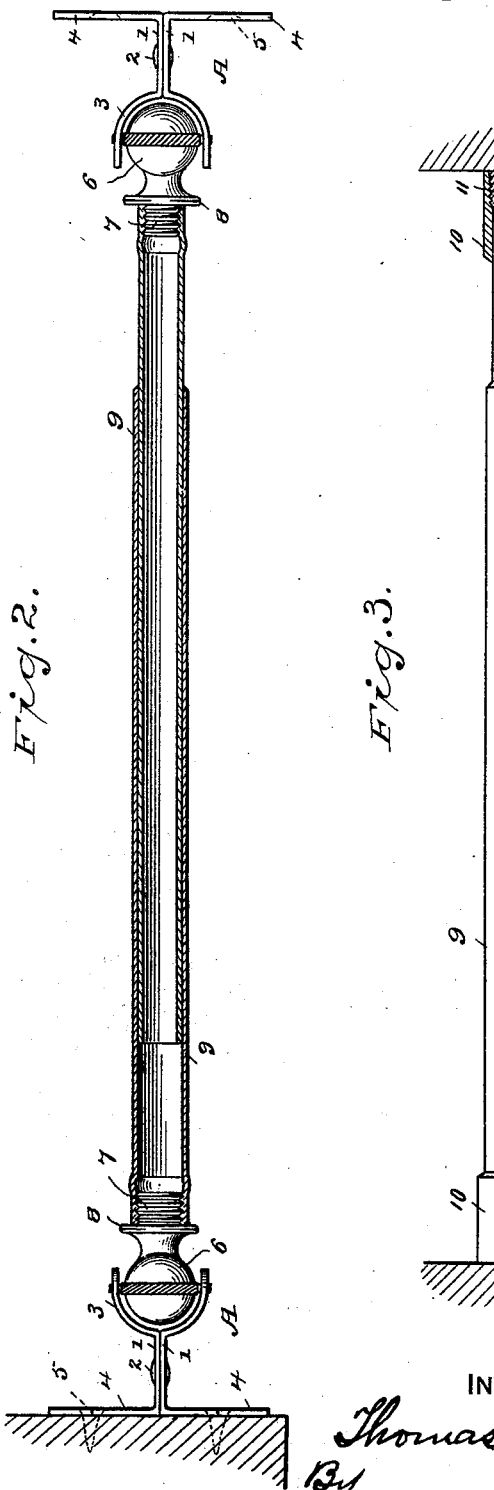

(No Model.)

T. MORRIS.
SWIVEL BRACKET FOR RODS.

No. 517,620. Patented Apr. 3, 1894.

WITNESSES
H. A. Lamb
Pearl Reynolds

INVENTOR
Thomas Morris
By H. M. Wooster
Atty.

UNITED STATES PATENT OFFICE.

THOMAS MORRIS, OF BROOKLYN, ASSIGNOR TO JULIUS BERBECKER & CO., OF NEW YORK, N. Y.

SWIVEL-BRACKET FOR RODS.

SPECIFICATION forming part of Letters Patent No. 517,620, dated April 3, 1894.

Application filed June 28, 1893. Serial No. 479,056. (No model.)

*To all whom it may concern:*

Be it known that I, THOMAS MORRIS, a citizen of the United States, residing at Brooklyn, in the county of Kings and State of New York, have invented certain new and useful Improvements in Swivel-Brackets for Rods; and I do hereby declare the following to be a full, clear, and exact description of the invention, such as will enable others skilled in the art to which it appertains to make and use the same.

My invention has for its object to provide a fixture for curtain rods, show windows, &c., which shall be practically universal in its application.

My novel invention consists essentially of a telescopic extension rod internally threaded at each end, and two brackets each of which carries a swiveled head having a threaded hub adapted to engage one end of the telescopic rod, said parts being so arranged that the fixture may be used with equal convenience on the inner faces of a window jamb or other recess i. e. as a vestibule bracket, or upon the outer faces thereof, i. e. as an ordinary outside bracket, or if it is not desired to use the brackets and swiveled heads the telescopic rod may be used in connection with the sleeves and hubs of an ordinary vestibule bracket.

In order to provide a fixture of this class which shall be complete in itself, may be produced at comparatively trifling cost, and which shall be adapted to various uses for which several styles of fixtures have heretofore been required I have devised the novel construction of which the following description in connection with the accompanying drawings is a specification, numbers being used to designate the several parts.

Figure 1 is a plan view illustrating the use of my novel fixture upon the outer face of a window jamb, the latter appearing in horizontal section; Fig. 2 a similar view partially in horizontal section illustrating the use of my novel fixture as a vestibule bracket, the brackets however having been given a quarter turn it being immaterial in this use whether the brackets are put up in the position shown in Fig. 1 or that in Fig. 2, and Fig. 3 is a plan view illustrating the use of my novel extension rod in connection with the sleeves and hubs of an ordinary vestibule bracket.

A denotes a bracket which is preferably made as shown in Fig. 2, that is to consist of two strips of metal designated by 1, the central portions of which lie in contact and are secured together by a rivet or rivets 2. One pair of ends are curved outward to form a yoke 3 the other pair of ends being bent outward at right angles to form a base 4 provided with holes 5, see dotted lines, to receive nails or screws by which the brackets are secured in place.

6 denotes heads which are pivoted to swing in the yokes, each head being provided with a threaded hub 7 and with a flange 8 at the base of the hub.

9 denotes my novel extension rod which consists of tubes, one of which lies closely within the other, the outer end of each tube being internally threaded as shown to receive one of the hubs 7.

The mode of use will be apparent from the drawings. The user is simply required to put up the brackets then to attach one end of the extension rod to one of the threaded hubs, and then to swing the other end of the rod into place and attach it to the other threaded hub, one section of the extension rod turning on the other. The rod is thus made practically self adjusting to any length within reasonable limits. As the heads swing freely in the yokes it will be apparent that the brackets may be placed at any angle desired, either upon the inner side or the outer face of a window jamb, wall or wherever they may be required.

In Fig. 3 I have illustrated my novel extension rod as used in connection with the sleeve 10 and hubs 11 of an ordinary vestibule bracket.

Having thus described my invention, I claim—

The combination with a rod consisting of tubes one of which is adapted to slide within the other, the outer end of each tube being internally screw threaded, of brackets A, and heads pivoted to swing in said brackets and provided with threaded hubs adapted to engage the threaded ends of the rod.

In testimony whereof I affix my signature in presence of two witnesses.

THOMAS MORRIS.

Witnesses:
 JULIUS BERBECKER,
 L. W. BOND.